US012802866B2

(12) United States Patent
Srimoon et al.

(10) Patent No.: US 12,802,866 B2
(45) Date of Patent: Nov. 17, 2026

(54) MULTILAYER COIL COMPONENT

(71) Applicant: Murata Manufacturing Co., Ltd., Kyoto-fu (JP)

(72) Inventors: Punnawadee Srimoon, Nagaokakyo (JP); Suradech Nohchai, Nagaokakyo (JP); Yuudai Suzuki, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 636 days.

(21) Appl. No.: 18/339,176

(22) Filed: Jun. 21, 2023

(65) Prior Publication Data

US 2024/0006112 A1 Jan. 4, 2024

(30) Foreign Application Priority Data

Jul. 4, 2022 (JP) ................................ 2022-107698

(51) Int. Cl.
*H01F 27/28* (2006.01)
*H01F 27/29* (2006.01)

(52) U.S. Cl.
CPC ....... *H01F 27/2804* (2013.01); *H01F 27/292* (2013.01); *H01F 2027/2809* (2013.01)

(58) Field of Classification Search
CPC ............... H01F 27/2804; H01F 27/292; H01F 2027/2809; H01F 17/0013; H01F 5/003; H01F 5/04; H01F 5/06; H01F 2017/0073
See application file for complete search history.

(56) References Cited

U.S. PATENT DOCUMENTS 5,251,108 A * 10/1993 Doshita .................. H05K 1/116 361/728
5,313,152 A * 5/1994 Wozniak ................... H02J 7/54 320/135
9,142,344 B2 * 9/2015 Tachibana ........... H01F 27/2804
2010/0109829 A1 * 5/2010 Sugiyama ........... H01F 17/0013 336/200
2010/0127812 A1 * 5/2010 Maeda ...................... H01F 3/08 336/200
2013/0200980 A1 * 8/2013 Yokoyama ............ H01F 27/292 336/200

(Continued)

FOREIGN PATENT DOCUMENTS

CN 104347239 A 2/2015
JP H11-186056 A 7/1999

(Continued)

*Primary Examiner* — Mang Tin Bik Lian
(74) *Attorney, Agent, or Firm* — Studebaker Brackett PLLC

(57) ABSTRACT

A multilayer coil component includes a multilayer body in which multiple insulating layers are laminated in a lamination direction and a coil is formed inside. The multilayer coil component also includes outer electrodes formed on respective surfaces of the multilayer body and electrically connected to the coil. The coil is formed of multiple coil conductors that are laminated together with the insulating layers in the lamination direction and are electrically connected to each other. The coil includes a parallel connection portion formed of two layers or more of the coil conductors that are electrically connected in parallel to each other by via conductors. The coil conductors laminated in the parallel connection portion have different conductor widths.

6 Claims, 4 Drawing Sheets

(56) References Cited

U.S. PATENT DOCUMENTS

| | | | | |
|---|---|---|---|---|
| 2015/0287514 | A1* | 10/2015 | Lim | H01F 17/0033 336/200 |
| 2015/0294779 | A1* | 10/2015 | Lim | H01F 27/292 336/192 |
| 2016/0042862 | A1* | 2/2016 | Tachibana | H01F 17/0013 336/200 |
| 2018/0374628 | A1* | 12/2018 | Yamauchi | H01F 27/24 |
| 2019/0074131 | A1* | 3/2019 | Yamanaka | H01F 27/292 |
| 2020/0176173 | A1* | 6/2020 | Tobita | H01F 27/34 |
| 2021/0287842 | A1* | 9/2021 | Hiraki | H01F 27/292 |
| 2022/0277879 | A1* | 9/2022 | Nagai | H01F 27/292 |

FOREIGN PATENT DOCUMENTS

| | | | |
|---|---|---|---|
| JP | 2004-095860 | A | 3/2004 |
| JP | 2009-44030 | A | 2/2009 |
| JP | 2010-109116 | A | 5/2010 |
| JP | 2011-049492 | A | 3/2011 |
| JP | 2019-009299 | A | 1/2019 |

* cited by examiner

MULTILAYER COIL COMPONENT

CROSS-REFERENCE TO RELATED APPLICATION

This application claims benefit of priority to Japanese Patent Application No. 2022-107698, filed Jul. 4, 2022, the entire content of which is incorporated herein by reference.

BACKGROUND

Technical Field

The present disclosure relates to a multilayer coil component.

Description of the Related Art

Japanese Unexamined Patent Application Publication No. 2010-109116 discloses an electronic component that includes a multilayer body, two outer electrodes, and multiple coil conductors. The multilayer body is formed by laminating multiple insulating layers. The two outer electrodes are formed on respective side surfaces of the multilayer body so as to extend in the lamination direction, the side surfaces facing oppositely to each other. The coil conductors are laminated together with the insulating layers so as to form a coil. The coil conductors not connected to the outer electrodes and having the same shape are connected in parallel to each other. At least one of the coil conductors connected to the outer electrodes is not connected in parallel to the coil conductors having the same shape. According to Japanese Unexamined Patent Application Publication No. 2010-109116, the electronic component can decrease the drop in resonance frequency while maintaining a large current carrying capacity.

SUMMARY

In a multilayer coil component, in general, the difference in degree of shrinkage between the coil conductors and the insulating layer tends to cause stress to concentrate in the insulating layer between coil conductors. The internal stress generated in the multilayer body becomes great especially in a structure in which multiple coil conductors are laminated and connected in parallel to each other by via conductors as described in Japanese Unexamined Patent Application Publication No. 2010-109116 because the volume of the via conductors overlapping each other in the lamination direction becomes large in this structure. When the internal stress exceeds the fracture toughness of the insulating layer, defects such as cracks may occur in the multilayer body, leading to a reduction in the overall strength of the multilayer coil component.

Accordingly, the present disclosure provides a multilayer coil component that can reduce internal stress generated in the multilayer body and thereby reduce the occurrence of defects, such as cracks.

According to the present disclosure, a multilayer coil component includes a multilayer body in which multiple insulating layers are laminated in a lamination direction and a coil is formed inside. The multilayer coil component also includes outer electrodes formed on respective surfaces of the multilayer body and electrically connected to the coil. The coil is formed of multiple coil conductors that are laminated together with the insulating layers in the lamination direction and are electrically connected to each other.

The coil includes a parallel connection portion formed of two layers or more of the coil conductors that are electrically connected in parallel to each other by via conductors. The coil conductors laminated in the parallel connection portion have different conductor widths.

According to the present disclosure, the multilayer coil component that reduces internal stress generated in the multilayer body and thereby reduces the occurrence of cracks can be provided.

DETAILED DESCRIPTION

Figure 1:
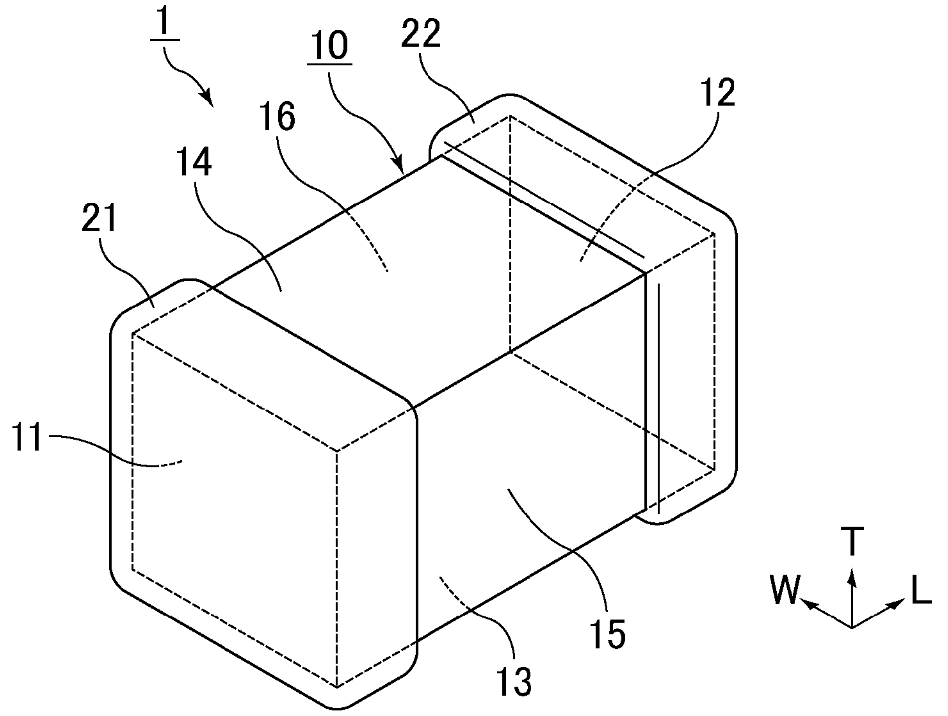
FIG. 1 is a perspective view schematically illustrating an example of a multilayer coil component of the present disclosure.

A multilayer coil component of the present disclosure will be described. Note that the configurations described herein are not intended to limit the present disclosure and can be modified appropriately within the scope of the present disclosure. In addition, a combination of individual preferred configurations described herein is deemed to fall within the scope of the present disclosure.

In the present specification, terms used to describe a relationship between elements (for example, "perpendicular", "parallel", "orthogonal", and so on) or to describe the shape of an element are not used in their strict senses but used so as to allow for a certain range, for example, a several-percent difference.

In the multilayer coil component of the present disclosure, coil conductors having different conductor widths (otherwise called "coil widths") are laminated in a parallel connection portion. With this configuration, internal stress generated in the multilayer body can be reduced, thereby reducing the occurrence of defects, such as cracks.

In a known structure, in which the coil conductors included in the parallel connection portion have the same conductor width, the stress concentrates at edges (or vertices) of the coil conductors. In contrast, in the structure of the present disclosure, in which the coil conductors included in a parallel connection portion have different conductor widths, the edges (vertices) of the coil conductors laminated in the parallel connection portion are shifted in position, which can reduce the stress concentration. Accordingly, the multilayer coil component of the present disclosure can reduce the internal stress occurring in the multilayer body.

In the multilayer coil component of the present disclosure, in a case of a coil including two or more parallel connection portions, it is sufficient that at least one of the parallel connection portions has the coil conductors having different conductor widths. Accordingly, the coil can include a parallel connection portion with the coil conductors having the same conductor width. In view of reducing the internal stress in the multilayer body, it is preferable that the coil conductors having different conductor widths are laminated in all of the parallel connection portions.

In a case where two or more parallel connection portions include the coil conductors having different conductor widths, the configuration of the conductor widths of the coil conductors can be the same or can be different among the parallel connection portions.

In the multilayer coil component of the present disclosure, the ratio of conductor widths among the coil conductors included in a parallel connection portion can be in a range of 1.05 or more and 1.2 or less (i.e., from 1.05 to 1.2). When the ratio of the conductor widths is in this range, the internal stress occurring in the multilayer body can be controlled to a specific value more flexibly by adjusting the ratio of the conductor widths of the coil conductors.

In the present specification, the ratio of the conductor widths of the coil conductors included in a parallel connection portion is defined as the ratio of W2 to W1 (in other words, W2/W1) where W1 represents the width of the thinnest coil conductor included in the parallel connection portion and W2 represents the width of the thickest coil conductor included therein.

In the multilayer coil component of the present disclosure, the parallel connection portion can be made of two layers of coil conductors or made of three or more layers of coil conductors. It is preferable that the parallel connection portion be made of five layers or less of coil conductors. For example, the parallel connection portion is made of three or four layers of coil conductors.

In the multilayer coil component of the present disclosure, in the case of the parallel connection portion being made of three layers or more of coil conductors, the lamination order of small-width coil conductors and large-width coil conductors is not specifically limited. For example, the width of a coil conductor positioned inward in the lamination direction can be greater than the width of a coil conductor positioned outward in the lamination direction. Alternatively, a small-width coil conductor and a large-width coil conductor can be laminated alternately. Here, if the parallel connection portion includes "n" layers ("n" is an integer of 5 or more) of coil conductors, "a coil conductor positioned outward" is one of the two outer most layers of the coil conductors, and "a coil conductor positioned inward" is one of the other layers, in other words, the (n−2) layers of the coil conductors.

In the multilayer coil component of the present disclosure, in the case of the parallel connection portion being made of three layers or more of coil conductors, coil conductors having two different conductor widths can be laminated in the parallel connection portion or coil conductors having three different conductor widths can be laminated.

Drawings to be referred to below are schematic illustrations, and accordingly dimensions, aspect ratios, or the like may be different from those of an actual product.

FIG. 1 is a perspective view schematically illustrating an example of a multilayer coil component of the present disclosure.

A multilayer coil component 1 illustrated in FIG. 1 includes a multilayer body 10 and outer electrodes 21 and 22. The multilayer body 10 is shaped like a cuboid having six faces. The multilayer body 10 is made of multiple insulating layers that are laminated in the lamination direction and includes a coil inside although not illustrated in FIG. 1. Each of the outer electrodes 21 and 22 is electrically connected to the coil.

As illustrated in FIG. 1, the length direction, the height direction, and the width direction of the multilayer coil component 1 and of the multilayer body 10 are denoted by L, T, and W, respectively. The length direction L, the height direction T, and the width direction W orthogonally intersect each other.

In the example illustrated in FIG. 1, the multilayer body 10 includes a first end surface 11 and a second end surface 12 that are opposite to each other in the length direction L, a first principal surface 13 and a second principal surface 14 that are opposite to each other in the height direction T, and a first side surface 15 and a second side surface 16 that are opposite to each other in the width direction W.

The edges and vertices of the multilayer body 10 are preferably rounded although not illustrated in FIG. 1. The vertices of the multilayer body 10 are portions at which three surfaces of the multilayer body 10 intersect, and the edges of the multilayer body 10 are portions at which two surfaces of the multilayer body 10 intersect.

For example, of the outer electrodes 21 and 22, the outer electrode 21 covers the first end surface 11 of the multilayer body 10 entirely as illustrated in FIG. 1. The outer electrode 21 extends from the first end surface 11 so as to cover part of the first principal surface 13, part of the second principal surface 14, part of the first side surface 15, and part of the second side surface 16.

For example, of the outer electrodes 21 and 22, the outer electrode 22 covers the second end surface 12 of the multilayer body 10 entirely as illustrated in FIG. 1. The outer electrode 22 extends from the second end surface 12 so as to cover part of the first principal surface 13, part of the second principal surface 14, part of the first side surface 15, and part of the second side surface 16.

When the multilayer coil component 1 with the outer electrodes 21 and 22 being disposed as described above is mounted on a circuit board, the mounting surface can be either the first principal surface 13, the second principal surface 14, the first side surface 15, or the second side surface 16 of the multilayer body 10.

Note that embodiments described below are examples, and configurations described in different embodiments can be partially replaced or combined with one another. In embodiments to be described after the first embodiment, the description will focus on differences, and the description of the same elements as those of the first embodiment will be omitted. The description of the same advantageous effects obtained by the same configuration in different embodiments will not be repeated.

Figure 2:
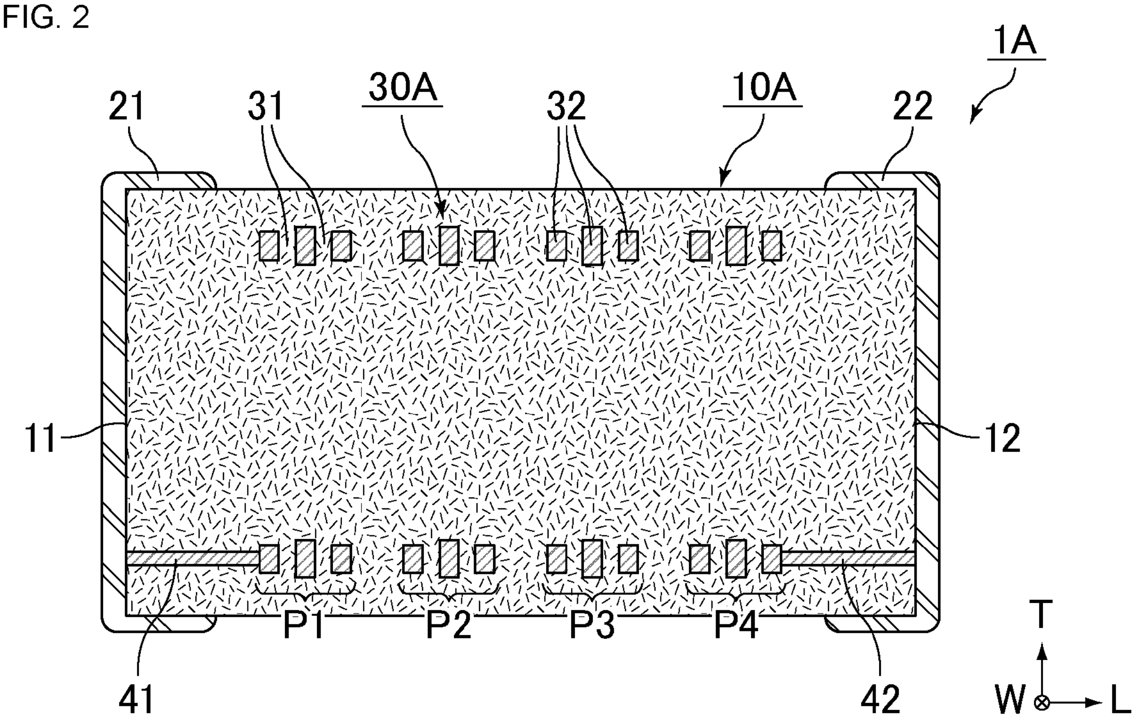
FIG. 2 is a cross-sectional view schematically illustrating an example of a multilayer coil component according to a first embodiment of the present disclosure.

FIG. 2 is a cross-sectional view schematically illustrating an example of a multilayer coil component according to a first embodiment of the present disclosure.

A multilayer coil component 1A illustrated in FIG. 2 includes a multilayer body 10A and outer electrodes 21 and 22 similarly to the multilayer coil component 1 of FIG. 1.

The multilayer body 10A is formed of multiple insulating layers 31 laminated in the lamination direction. In the example illustrated in FIG. 2, the insulating layers 31 are laminated in the length direction L. Accordingly, the lamination direction is the length direction L.

The multilayer body 10A includes a coil 30A inside. The coil 30A also includes multiple coil conductors 32 that are laminated in the lamination direction (i.e., in the length direction L) together with the insulating layers 31. The coil conductors 32 are electrically connected to each other.

The coil 30A is electrically connected to the outer electrodes 21 and 22.

Figure 3:
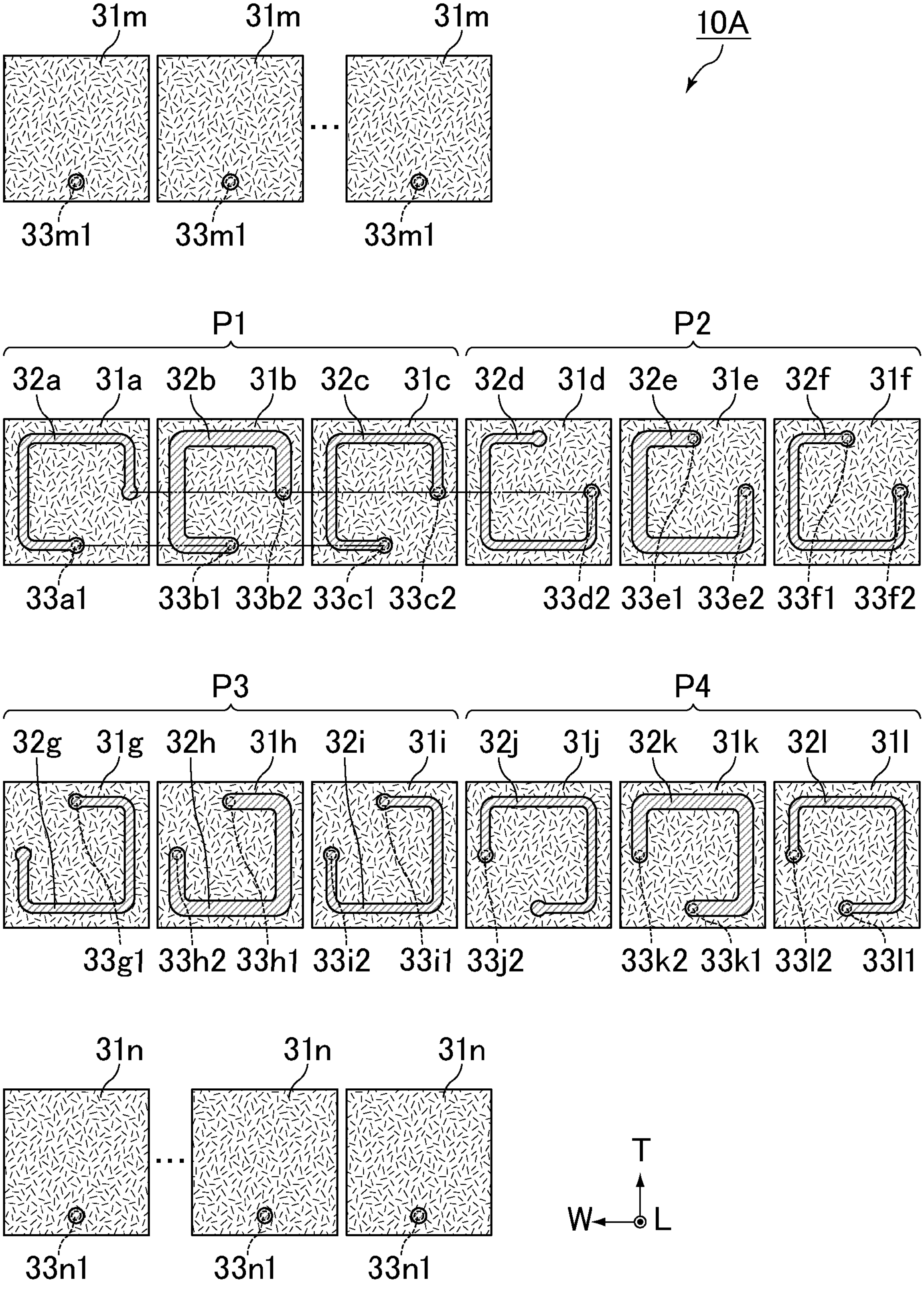
FIG. 3 is an exploded plan view schematically illustrating an example of a multilayer body included in the multilayer coil component of FIG. 2.

FIG. 3 is an exploded plan view schematically illustrating an example of a multilayer body included in the multilayer coil component of FIG. 2.

As illustrated in FIG. 3, the multilayer body 10A includes the insulating layers 31 as illustrated in FIG. 2, in other words, multiple insulating layers 31*m*, 31*m*-31*m*, 31*a*, 31*b*, 31*c*, 31*d*, 31*e*, 31*f*, 31*g*, 31*h*, 31*i*, 31*j*, 31*k*, 311, 31*n*-31*n*, and 31*n* that are laminated in the length direction L from the first end surface 11 to the second end surface 12 of the multilayer body 10A. The insulating layers 31*m* can be one layer or two layers or more. Similarly, the insulating layers 31*n* can be one layer or two layers or more. The insulating layers 31*a*, 31*b*, 31*c*, 31*d*, 31*e*, 31*f*, 31*g*, 31*h*, 31*i*, 31*j*, 31*k*, 311, 31*m*, and 31*n* may be collectively referred to as the insulating layers 31.

In FIG. 3, the insulating layers 31*m* are disposed at the bottom in the lamination direction (near the first end surface 11 of the multilayer body 10A), and the insulating layers 31*n* are disposed at the top in the lamination direction (near the second end surface 12 of the multilayer body 10A). Each insulating layer 31 has an upper principal surface and a lower principal surface in the lamination direction, and the upper principal surface is disposed on the positive side of the insulating layer 31 in the length direction L (i.e., at a shallower position in the depth direction of FIG. 3) and the lower principal surface is disposed on the negative side of the insulating layer 31 in the length direction L (i.e., at a deeper position in the depth direction of FIG. 3).

The insulating layers 31 are made of, for example, a magnetic material, such as a ferrite material.

As illustrated in FIG. 3, coil conductors 32*a*, 32*b*, 32*c*, 32*d*, 32*e*, 32*f*, 32*g*, 32*h*, 32*i*, 32*j*, 32*k*, and 32*l* are formed in respective insulating layers 31*a*, 31*b*, 31*c*, 31*d*, 31*e*, 31*f*, 31*g*, 31*h*, 31*i*, 31*j*, 31*k*, and 311 so as to form coil conductors 32 illustrated in FIG. 2. The coil conductors 32*a*, 32*b*, 32*c*, 32*d*, 32*e*, 32*f*, 32*g*, 32*h*, 32*i*, 32*j*, 32*k*, and 32*l* may be collectively referred to as the coil conductors 32.

The coil conductors 32*a*, 32*b*, 32*c*, 32*d*, 32*e*, 32*f*, 32*g*, 32*h*, 32*i*, 32*j*, 32*k*, and 32*l* are formed on principal surfaces of respective insulating layers 31*a*, 31*b*, 31*c*, 31*d*, 31*e*, 31*f*, 31*g*, 31*h*, 31*i*, 31*j*, 31*k*, and 311, more specifically, respective upper principal surfaces each positioned on the positive side in the length direction L (i.e., at a shallower position in the depth direction of FIG. 3).

In the example illustrated in FIG. 3, the length of each coil conductor 32 is three fourths of one turn of the coil 30A. In other words, lamination of four layers of the coil conductors 32 is required to form three turns of the coil 30A.

The insulating layer 31*a* has a via conductor 33*a*1 connected to one end of the coil conductor 32*a*. The insulating layer 31*b* has via conductors 33*b*1 and 33*b*2 connected to respective opposite ends of the coil conductor 32*b*. The insulating layer 31*c* has via conductors 33*c*1 and 33*c*2 connected to respective opposite ends of the coil conductor 32*c*. The insulating layer 31*d* has a via conductor 33*d*2 connected to one end of the coil conductor 32*d*. The insulating layer 31*e* has via conductors 33*e*1 and 33*e*2 connected to respective opposite ends of the coil conductor 32*e*. The insulating layer 31*f* has via conductors 33*f*1 and 33*f*2 connected to respective opposite ends of the coil conductor 32*f* The insulating layer 31*g* has a via conductor 33*g*1 connected to one end of the coil conductor 32*g*. The insulating layer 31*h* has via conductors 33*h*1 and 33*h*2 connected to respective opposite ends of the coil conductor 32*h*. The insulating layer 31*i* has via conductors 33*i*1 and 33*i*2 connected to respective opposite ends of the coil conductor 32*i*. The insulating layer 31*j* has a via conductor 33*j*2 connected to one end of the coil conductor 32*j*. The insulating layer 31*k* has via conductors 33*k*1 and 33*k*2 connected to respective opposite ends of the coil conductor 32*k*. The insulating layer 31*l* has via conductors 33*l*1 and 33*l*2 connected to respective opposite ends of the coil conductor 32*l*. The insulating layers 31*m* has respective via conductors 33*m*1. The insulating layers 31*n* has respective via conductors 33*n*1. The via conductors 33*a*1, 33*b*1, 33*b*2, 33*c*1, 33*c*2, 33*d*2, 33*e*1, 33*e*2, 33*f*1, 33*f*2, 33*g*1, 33*h*1, 33*h*2, 33*i*1, 33*i*2, 33*j*2, 33*k*1, 33*k*2, 33*l*1, 33*l*2, 33*m*1, and 33*n*1 may be collectively referred to as the via conductors 33.

The via conductors 33 are formed so as to pierce respective insulating layers 31 in the lamination direction (in the length direction L in FIG. 2).

It is preferable that a land connected to each via conductor 33 be formed on the principal surface of each insulating layer 31. In this case, the size of the land is slightly larger than the width of the coil conductor 32.

The coil conductors 32 (including the lands) and the via conductors 33 are made of, for example, Ag, Au, Cu, Pd, Ni, Al, or an alloy containing at least one of these.

The insulating layers 31 as structured in FIG. 3 are laminated in the length direction L, which electrically connects the coil conductors 32 to each other through the via conductors 33. As a result, the solenoid-type coil 30A having the coil axis extending in the length direction L is formed inside the multilayer body 10A as illustrated in FIG. 2.

An extension conductor 41 illustrated in FIG. 2 is also formed, inside the multilayer body 10A, of the via conductor 33*a*1 formed through the insulating layer 31*a* and the via conductors 33*m*1 formed through the insulating layers 31*m* as illustrated in FIG. 3. The extension conductor 41 is exposed at the first end surface 11 of multilayer body 10A. The extension conductor 41 connects between the outer electrode 21 and the coil conductor 32*a* inside the multilayer body 10A.

Similarly, an extension conductor 42 illustrated in FIG. 2 is also formed, inside the multilayer body 10A, of the via conductor 33*l*1 formed through the insulating layer 31*l* and the via conductors 33*n*1 formed through the insulating layers 31*n* as illustrated in FIG. 3. The extension conductor 42 is exposed at the second end surface 12 of multilayer body 10A. The extension conductor 42 connects between the outer electrode 22 and the coil conductor 32*l* inside the multilayer body 10A.

When the coil 30A is viewed in the length direction L, the coil 30A can have a shape formed of straight lines (for example, a polygonal shape) as illustrated in FIG. 3, or can have a shape formed of a curved line (for example, a circular shape), or can have a shape formed of straight lines and a curved line.

In the example illustrated in FIGS. 2 and 3, a mounting surface (for example, the first principal surface 13) of the multilayer body 10A extends parallel to the lamination direction of the insulating layers 31 and also parallel to the coil axis of the coil 30A. The mounting surface (for example, the first principal surface 13) of the multilayer body 10A, however, can extend in a direction orthogonal to the lamination direction of the insulating layers 31 and also orthogonal to the coil axis of the coil 30A.

As illustrated in FIGS. 2 and 3, the coil 30A includes four parallel connection portions P1, P2, P3, and P4. In each of the four parallel connection portions, three layers of coil conductor 32 are electrically connected in parallel by the via conductors 33. Note that the number of parallel connection portions included in the coil 30A is not specifically limited.

More specifically, as illustrated in FIG. 3, three coil conductors 32*a*, 32*b*, and 32*c* are electrically connected in parallel by the via conductors 33*b*1, 33*b*2, 33*c*1, and 33*c*2 to form the parallel connection portion P1. Three coil conductors 32*d*, 32*e*, and 32*f* are electrically connected in parallel by the via conductors 33*e*1, 33*e*2, 33*f*1, and 33*f*2 to form the parallel connection portion P2. The parallel connection portions P1 and P2 are electrically connected in series by the via conductor 33*d*2. Three coil conductors 32*g*, 32*h*, and 32*i* are electrically connected in parallel by the via conductors 33*h*1, 33*h*2, 33*i*1, and 33*i*2 to form the parallel connection portion P3. The parallel connection portions P2 and P3 are electrically connected in series by the via conductor 33*g*1. Three coil conductors 32*j*, 32*k*, and 32*l* are electrically connected in parallel by the via conductors 33*k*1, 33*k*2, 33*l*1, and 33*l*2 to form the parallel connection portion P4. The parallel connection portions P3 and P4 are electrically connected in series by the via conductor 33*j*2.

The shapes of the coil conductors 32 are the same among the parallel connection portions P1, P2, P3, and P4. However, the coil conductors 32 laminated in each of the parallel connection portions P1, P2, P3, and P4 have different conductor widths.

In the parallel connection portion P1, the width of the coil conductor 32*b* positioned inward in the lamination direction is greater than the width of the coil conductors 32*a* and 32*c* positioned outward in the lamination direction. The widths of the coil conductor 32*a* and the coil conductor 32*c* can be the same or can be different.

In the parallel connection portion P2, the width of the coil conductor 32*e* positioned inward in the lamination direction is greater than the width of the coil conductors 32*d* and 32*f* positioned outward in the lamination direction. The widths of the coil conductor 32*d* and the coil conductor 32*f* can be the same or can be different.

In the parallel connection portion P3, the width of the coil conductor 32*h* positioned inward in the lamination direction is greater than the width of the coil conductors 32*g* and 32*i* positioned outward in the lamination direction. The widths of the coil conductor 32*g* and the coil conductor 32*i* can be the same or can be different.

In the parallel connection portion P4, the width of the coil conductor 32*k* positioned inward in the lamination direction is greater than the width of the coil conductors 32*j* and 32*l* positioned outward in the lamination direction. The widths of the coil conductor 32*j* and the coil conductor 32*l* can be the same or can be different.

In the parallel connection portions P1, P2, P3, and P4, the widths of the coil conductors 32*b*, 32*e*, 32*h*, and 32*k* can be the same or can be different partially or entirely.

In the parallel connection portions P1, P2, P3, and P4, the widths of the coil conductors 32*a*, 32*c*, 32*d*, 32*f*, 32*g*, 32*i*, 32*j*, and 32*l* can be the same or can be different partially or entirely.

In each of the parallel connection portions P1, P2, P3, and P4, as described above, the width of the coil conductor 32 positioned inward in the lamination direction is greater than the width of the coil conductors 32 positioned outward in the lamination direction. Moreover, in each of the parallel connection portions P1, P2, P3, and P4, a small-width coil conductor 32 and a large-width coil conductor 32 are laminated alternately.

In the example illustrated in FIGS. 2 and 3, a small-width coil conductor 32, a large-width coil conductor 32, and a small-width coil conductor 32 are laminated in this sequence in each of the parallel connection portions P1, P2, P3, and P4. However, the lamination structure of the coil conductors 32 is not limited to this. For example, a large-width coil conductor 32, a small-width coil conductor 32, and a large-width coil conductor 32 can be laminated in this sequence. Alternatively, a large-width coil conductor 32, a small-width coil conductor 32, and a small-width coil conductor 32 can be laminated in this sequence. Alternatively, a large-width coil conductor 32, a large-width coil conductor 32, and a small-width coil conductor 32 can be laminated in this sequence. The coil 30A can include a parallel connection portion that has a different lamination structure of the coil conductors 32.

Figure 4:
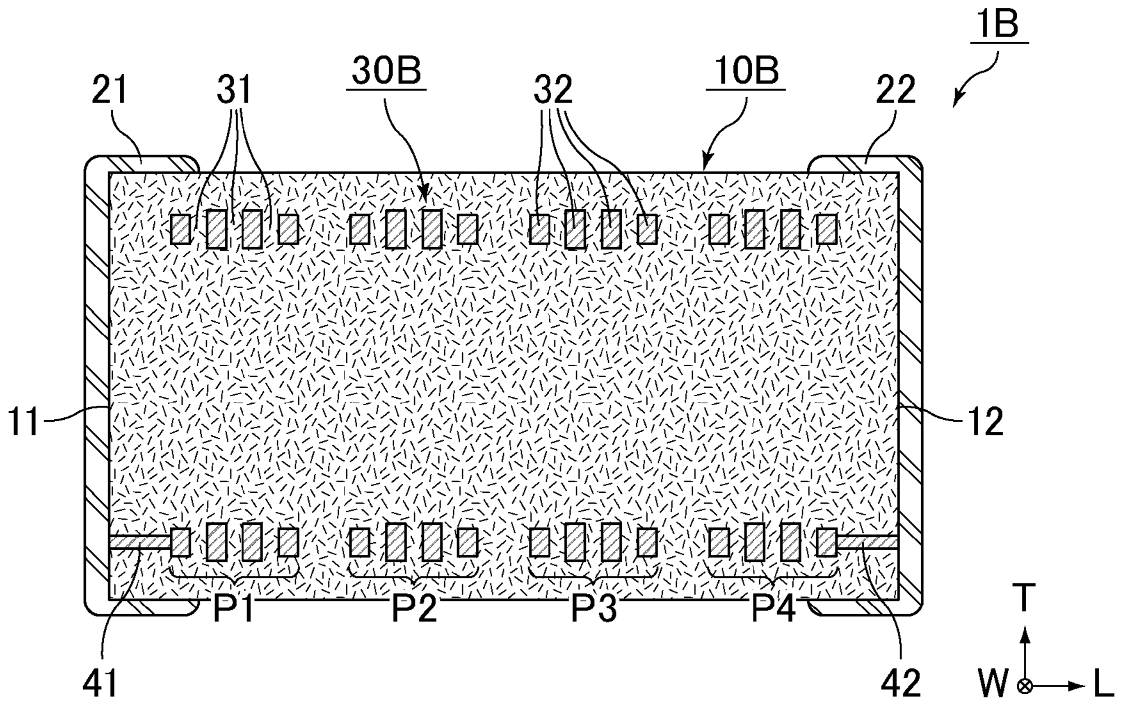
FIG. 4 is a cross-sectional view schematically illustrating an example of a multilayer coil component according to a second embodiment of the present disclosure.

FIG. 4 is a cross-sectional view schematically illustrating an example of a multilayer coil component according to a second embodiment of the present disclosure.

As illustrated in FIG. 4, a multilayer coil component 1B includes parallel connection portions P1, P2, P3, and P4 each of which is formed of four layers of the coil conductors 32. Note that the number of parallel connection portions included in a coil 30B inside a multilayer body 10B is not specifically limited.

In each of the parallel connection portions P1, P2, P3, and P4, the width of coil conductors 32 positioned inward in the lamination direction (in the length direction L) is greater than the width of coil conductors 32 positioned outward in the lamination direction.

The widths of the coil conductors 32 positioned inward in the lamination direction can be the same or can be different. Similarly, the widths of the coil conductors 32 positioned outward in the lamination direction can be the same or can be different.

Figure 5:
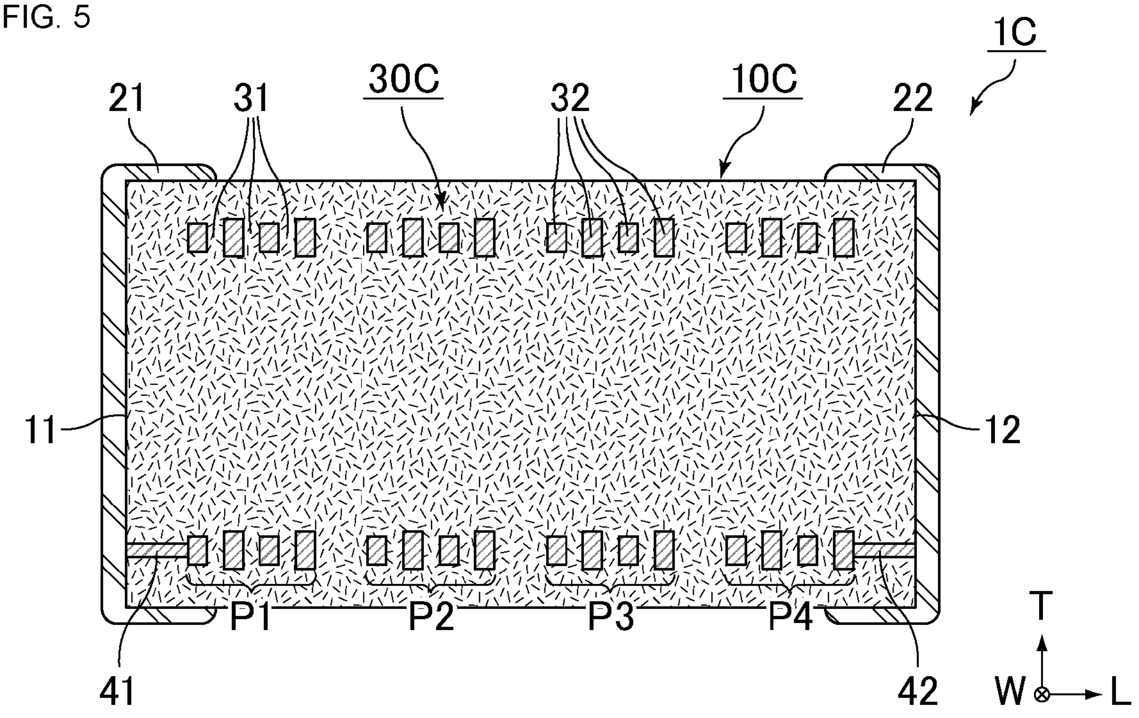
FIG. 5 is a cross-sectional view schematically illustrating an example of a multilayer coil component according to a third embodiment of the present disclosure.

FIG. 5 is a cross-sectional view schematically illustrating an example of a multilayer coil component according to a third embodiment of the present disclosure.

As illustrated in FIG. 5, a multilayer coil component 1C includes parallel connection portions P1, P2, P3, and P4 each of which is formed of four layers of the coil conductors 32. Note that the number of parallel connection portions included in a coil 30C inside a multilayer body 10C is not specifically limited.

In each of the parallel connection portions P1, P2, P3, and P4, a small-width coil conductor 32 and a large-width coil conductor 32 are laminated alternately.

The widths of the small-width coil conductors 32 can be the same or can be different. Similarly, the widths of the large-width coil conductors 32 can be the same or can be different.

Figure 6:
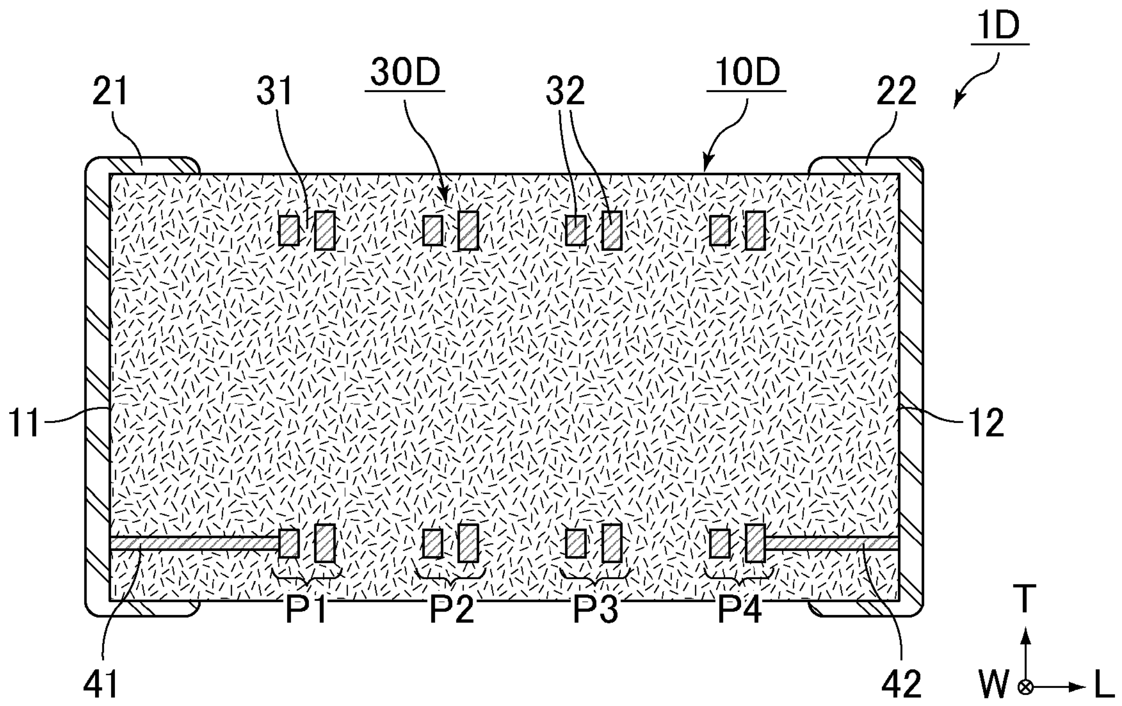
FIG. 6 is a cross-sectional view schematically illustrating an example of a multilayer coil component according to a fourth embodiment of the present disclosure.

FIG. 6 is a cross-sectional view schematically illustrating an example of a multilayer coil component according to a fourth embodiment of the present disclosure.

As illustrated in FIG. 6, a multilayer coil component 1D includes parallel connection portions P1, P2, P3, and P4 each of which is formed of two layers of the coil conductors 32. Note that the number of parallel connection portions included in a coil 30D inside a multilayer body 10D is not specifically limited.

In each of the parallel connection portions P1, P2, P3, and P4, a small-width coil conductor 32 and a large-width coil conductor 32 are laminated.

In the examples illustrated in FIGS. 2, 4, 5, and 6, the cross-sectional shape of each coil conductor 32 is substantially a rectangle of which the lengths of the opposite sides in the lamination direction (i.e., the length direction L) are the same. However, the cross-sectional shape of the coil conductor 32 is not specifically limited. For example, the cross-sectional shape can be a trapezoid of which the lengths of the opposite sides in the lamination direction are different.

An example method of manufacturing the multilayer coil component of the present disclosure will be described.

Preparation of Magnetic Material $Fe_2O_3$, ZnO, CuO, and NiO are first weighed in accordance with a predetermined ratio.

Next, the above weighed materials, pure water, and others are mixed together with PSZ (partially stabilized zirconia) media in a ball mill, and the mixture is pulverized. The duration of mixing and pulverizing is, for example, four hours or more and 8 hours or less (i.e., from 4 hours to 8 hours).

The pulverized material obtained is dried and calcined. The calcination temperature is, for example, 700° C. or more and 800° C. or less (i.e., from 700° C. to 800° C.). The calcination duration is, for example, 2 hours or more and 5 hours or less (i.e., from 2 hours to 5 hours).

Thus, a pulverized magnetic material, more specifically, a pulverized magnetic ferrite material is produced.

The ferrite material is preferably a Ni—Cu—Zn-based ferrite material.

The Ni—Cu—Zn-based ferrite material preferably contains, when the total amount is 100 mol %, 40 mol % or more and 49.5 mol % or less (i.e., from 40 mol % to 49.5 mol %) of Fe in the form of $Fe_2O_3$, 2 mol % or more and 35 mol % or less (i.e., from 2 mol % to 35 mol %) of Zn in the form of ZnO, 6 mol % or more and 13 mol % or less (i.e., from 6 mol % to 13 mol %) of Cu in the form of CuO, and 10 mol % or more and 45 mol % or less (i.e., from 10 mol % to 45 mol %) of Ni in the form of NiO.

The Ni—Cu—Zn-based ferrite material can contain additives, such as Co, Bi, Sn, and Mn.

The Ni—Cu—Zn-based ferrite material can also contain inevitable impurities.

Preparation of Green Sheet

Subsequently, the magnetic material together with the PSZ media is mixed with, for example, an organic binder, such as a polyvinyl butyral based resin, an organic solvent, such as ethanol or toluen, and a plasticizer in a ball mill, and the mixture is pulverized to prepare a slurry.

Next, the slurry is spread using the doctor blade method or the like so as to form a sheet with a predetermined thickness. Green sheets having a predetermined shape are punched out of the sheet. The thickness of a green sheet is, for example, 20 μm or more and 30 μm or less (i.e., from 20 μm to 30 μm). The shape of the green sheet is, for example, substantially rectangular.

The material of the green sheet is not limited to the above magnetic material but can be a non-magnetic material, such as borosilicate glass, or a mixture of a magnetic material and a non-magnetic material.

Formation of Conductor Patterns

Via holes are first formed by emitting laser beam to a green sheet at predetermined positions.

Next, an electroconductive paste, such as Ag paste, is applied on the surface of the green sheet using the screen printing method or the like while the via holes are filled with the electroconductive paste. Accordingly, the conductor patterns for the via conductors are printed at respective via holes on the green sheet, and the conductor patterns for the coil conductors are also printed so as to be connected to the conductor patterns for the via conductors. Coil sheets are thereby produced. The coil sheets are the green sheets on which the conductor patterns for the coil conductors and the coil conductor patterns for the via conductors are printed. The conductor patterns for the coil conductors formed on respective coil sheets later become the coil conductors 32 illustrated in FIG. 3. The conductor patterns for the via conductors formed on respective coil sheets later become the via conductors 33 illustrated in FIG. 3 (excluding the via conductors **33*m*1 and 33*n*1). Via sheets are produced separately from the coil sheets. The conductor patterns for the via conductors formed on respective via sheets later become the via conductors 33*m*1 and 33*n*1 illustrated in FIG. 3**.

Preparation of Multilayer Block

The coil sheets and the via sheets are layered in the lamination direction (in the length direction L in FIG. 3) in the order illustrated in FIG. 3, and the layered sheets are subjected to thermal-pressure bonding to produce a multilayer block.

Preparation of Multilayer Body and Coil

The multilayer block is cut into separated chips having a predetermined size using a dicing machine.

The separated chips are subsequently burnt. The burning temperature is, for example, 900° C. or more and 920° C. or less (i.e., from 900° C. to 920° C.). The burning duration is, for example, 2 hours or more and 4 hours or less (i.e., from 2 hours to 4 hours).

When each separated chip is burnt, the portion of the coil sheet and the portion of the via sheet that are derived from the green sheet become the insulating layer.

When each separated chip is burnt, the conductor patterns for the coil conductors and the conductor patterns for the via conductors become the coil conductors and the via conductors, respectively. The coil is thus produced. The coil is made of the coil conductors that are laminated together with the insulating layers and electrically connected to each other by the via conductors.

Thus, the multilayer body in which multiple insulating layers are laminated in the lamination direction and the coil is formed inside is produced.

The multilayer body can be subjected to barrel polishing to round edges and vertices.

Formation of Outer Electrodes

An electroconductive paste, such as a paste containing Ag and glass frit, is applied on each end surface of the multilayer body at which the extension of the coil is exposed, thereby forming an electroconductive paste layer.

The electroconductive paste layer is burnt to form a base electrode (base layer) of the outer electrode. The burning temperature is, for example, 800° C. or more and 820° C. or less (i.e., from 800° C. to 820° C.). The thickness of the base electrode is, for example, 5 μm.

A Ni-plating layer and a Sn-plating layer are formed on the base electrode by electrolytic plating or the like. Thus, the outer electrode is formed to have the base electrode, the Ni-plating layer, and the Sn-plating layer.

Thus, the multilayer coil component is produced.

The following summarizes the points disclosed in the present specification.

<1> A multilayer coil component includes a multilayer body in which multiple insulating layers are laminated in a lamination direction and a coil is formed inside. The multilayer coil component also includes outer electrodes formed on respective surfaces of the multilayer body and electrically connected to the coil. The coil is formed of multiple coil conductors that are laminated together with the insulating layers in the lamination direction and are electrically connected to each other. The coil includes a parallel connection portion formed of two layers or more of the coil conductors that are electrically connected in parallel to each other by via conductors. The coil conductors laminated in the parallel connection portion have different conductor widths.

<2> In the multilayer coil component described in <1> above, a ratio of conductor widths among the coil conductors included in the parallel connection portion is 1.05 or more and 1.2 or less (i.e., from 1.05 to 1.2).

<3> In the multilayer coil component described in <1> or <2> above, the parallel connection portion is formed of three layers or more of the coil conductors.

<4> In the multilayer coil component described in any one of <1> to <3>, in the parallel connection portion, a conductor width of a coil conductor positioned inward in the lamination direction is greater than a conductor width of a coil conductor positioned outward in the lamination direction.

<5> In the multilayer coil component described in <4> above, the parallel connection portion is formed of three or four layers of the coil conductors.

<6> In the multilayer coil component described in any one of <1> to <4>, in the parallel connection portion, a small-width coil conductor and a large-width coil conductor are laminated alternately.

<7> In the multilayer coil component described in <6> above, the parallel connection portion is formed of three or four layers of the coil conductors.

EXAMPLES

Examples are provided below to disclose the multilayer coil component of the present disclosure more specifically. Note that the examples are not intended to limit the present disclosure.

Example 1

A multilayer coil component having the structure illustrated in FIG. 2 was prepared through the following steps.

1) A ferrite sheet was obtained by pulverizing a ferrite material and mixing the ferrite material with an organic binder and a wetting agent and subsequently by spreading the mixture on a PET film to form a thin layer.
2) The coil patterns were printed on the ferrite sheet using printing patterns with the Ag paste.
3) Two types of printing patterns were used to form two types of coil conductors having different conductor widths (conductor widths of 72 μm and 60 μm).
4) A multilayer block was obtained by laminating the sheets to which the electroconductive paste was applied so as to form a triple coil having the parallel connection portions each of which was made of three layers of coil conductors.
5) The multilayer block was cut into multilayer chips.
6) The multilayer chips were burnt in a kiln at 920° C. to produce multilayer bodies each having a coil therein.
7) The base electrodes were formed on the end surfaces of each multilayer body, and the multilayer body was subjected to plating to produce the multilayer coil component of Example 1.

The multilayer coil component of Example 1 was cross-sectioned at the center, and the conductor widths of the coil conductors included in a parallel connection portion were measured. As a result, the coil conductors positioned outward in the lamination direction had a conductor width of 90 μm, and the coil conductor positioned inward had a conductor width of 108 μm. In other words, the ratio of the conductor widths among the coil conductors included in the parallel connection portion was 1.2.

Example 2

A multilayer coil component having a structure illustrated in FIG. 4 or FIG. 5 was prepared through the following steps.

1) A ferrite sheet was obtained by pulverizing the ferrite material and mixing the ferrite material with the organic binder and the wetting agent and subsequently by spreading the mixture on a PET film to form a thin layer.
2) The coil patterns were printed on the ferrite sheet using printing patterns with the Ag paste.
3) Two types of printing patterns were used to form two types of coil conductors having different conductor widths (conductor widths of 72 μm and 60 μm).
4) A multilayer block was obtained by laminating the sheets to which the electroconductive paste was applied so as to form a quadruple coil having the parallel connection portions each of which was made of four layers of coil conductors.
5) The multilayer block was cut into multilayer chips.
6) The multilayer chips were burnt in a kiln at 920° C. to produce multilayer bodies each having a coil therein.
7) The base electrodes were formed on the end surfaces of each multilayer body, and the multilayer body was subjected to plating to produce the multilayer coil component of Example 2.

The multilayer coil component of Example 2 was cross-sectioned at the center, and the conductor widths of the coil conductors included in a parallel connection portion were measured. As a result, the coil conductors positioned outward in the lamination direction had a conductor width of 90 μm, and the coil conductors positioned inward had a conductor width of 108 μm. In other words, the ratio of the conductor widths among the coil conductors included in the parallel connection portion was 1.2.

Example 3

In the multilayer coil component having the structure illustrated in FIG. 2, stress generated in an insulating layer (made of ferrite) between adjacent coil conductors (made of Ag) was calculated using Femtet®, an FEM simulation software developed by Murata Software Co., Ltd.

Figure 7:
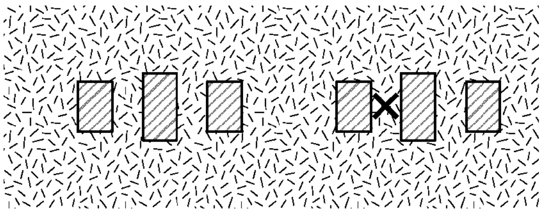
FIG. 7 is an enlarged view for explaining a point at which stress is calculated.

FIG. 7 is an enlarged view for explaining a point at which stress is calculated.

The stress generated at point X in FIG. 7 was calculated in the simulation in which the conductor width of the coil conductors positioned outward in the lamination direction in a parallel connection portion was set to be 1 while the conductor width of the coil conductor positioned inward was changed from 1 to 1.9. The change in stress was plotted in FIG. 8 while the stress was set to be 1 when the ratio of the conductor widths of the coil conductor positioned inward to that of the coil conductors positioned outward was 1.

Figure 8:
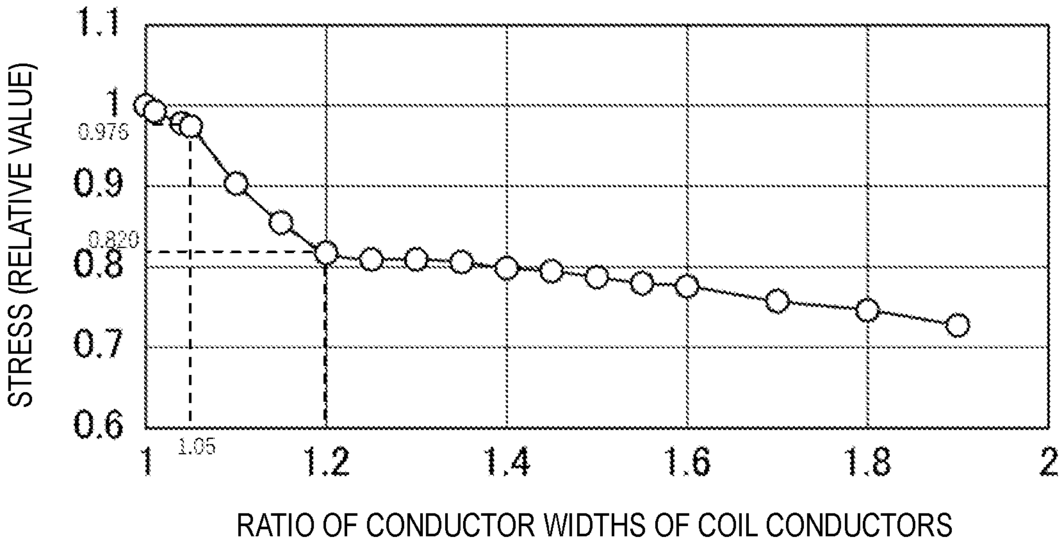
FIG. 8 is a graph illustrating a relationship between stress and a ratio of conductor widths of coil conductors included in a parallel connection portion.

FIG. 8 is a graph illustrating a relationship between the stress and the ratio of the conductor widths of the coil conductors included in a parallel connection portion. When the ratio of the conductor widths of the coil conductors included in the parallel connection portion was 1.05, the stress (relative value) was 0.976. When the ratio of the conductor widths of the coil conductors included in the parallel connection portion was 1.2, the stress (relative value) was 0.820. As clearly seen from FIG. 8, when the ratio of the conductor widths of the coil conductors included in the parallel connection portion exceeds 1.2, the stress becomes small but the rate of change becomes gentle compared with the case where the ratio of the conductor widths is 1.2 or less. Accordingly, when the ratio of the conductor widths of the coil conductors exceeds 1.2, it becomes more difficult to control the stress generated in the multilayer body by adjusting the ratio of the conductor widths of the coil conductors.

As clearly seen from FIG. 8, when the ratio of the conductor widths of the coil conductors included in the parallel connection portion is 1.05 or more and 1.2 or less (i.e., from 1.05 to 1.2), the stress can be reduced effectively.

What is claimed is:

1. A multilayer coil component comprising:

a multilayer body in which multiple insulating layers are laminated in a lamination direction and a coil is inside; and outer electrodes on surfaces of the multilayer body and electrically connected to the coil, wherein the coil includes multiple coil conductors that are laminated together with the insulating layers in the lamination direction and are electrically connected to each other, the coil includes a parallel connection portion including three layers or more of the coil conductors that are electrically connected in parallel to each other by via conductors, the coil conductors laminated in the parallel connection portion have different conductor widths, and in the parallel connection portion, a first small-width coil conductor, a large-width coil conductor, and a second small-width conductor are laminated in this sequence, in which the large-width coil conductor has a greater width than the first and second small-width coil conductors.

2. The multilayer coil component according to claim 1, wherein a ratio of conductor widths among the coil conductors included in the parallel connection portion is from 1.05 to 1.2.

3. The multilayer coil component according to claim 1, wherein in the parallel connection portion, a conductor width of a coil conductor positioned inward in the lamination direction is greater than a conductor width of a coil conductor positioned outward in the lamination direction.

4. The multilayer coil component according to claim 3, wherein the parallel connection portion includes three or four layers of the coil conductors.

5. A multilayer coil component comprising:

a multilayer body in which multiple insulating layers are laminated in a lamination direction and a coil is inside; and outer electrodes on surfaces of the multilayer body and electrically connected to the coil, wherein the coil includes multiple coil conductors that are laminated together with the insulating layers in the lamination direction and are electrically connected to each other, the coil includes a parallel connection portion including three layers or more of the coil conductors that are electrically connected in parallel to each other by via conductors, the coil conductors laminated in the parallel connection portion have different conductor widths, and in the parallel connection portion, a large-width coil conductor, a first small-width coil conductor, and a second small-width conductor are laminated in this sequence, in which the large-width coil conductor has a greater width than the first and second small-width coil conductors.

6. A multilayer coil component comprising:

a multilayer body in which multiple insulating layers are laminated in a lamination direction and a coil is inside; and outer electrodes on surfaces of the multilayer body and electrically connected to the coil, wherein the coil includes multiple coil conductors that are laminated together with the insulating layers in the lamination direction and are electrically connected to each other, the coil includes a parallel connection portion including three layers or more of the coil conductors that are electrically connected in parallel to each other by via conductors, the coil conductors laminated in the parallel connection portion have different conductor widths, and in the parallel connection portion, a first large-width coil conductor, a second large-width coil conductor, and a small-width conductor are laminated in this sequence, in which the large-width coil conductors have a greater width than the small-width coil conductor.

* * * * *